United States Patent [19]
Furukawa et al.

[11] Patent Number: 5,707,315
[45] Date of Patent: Jan. 13, 1998

[54] CONTROL SYSTEM FOR HYDRAULICALLY OPERATED VEHICLE TRANSMISSION

[75] Inventors: Hideo Furukawa; Tatsuyuki Ohashi, both of Wako, Japan

[73] Assignee: Honda Giken Kogyo Kabushiki Kaisha, Tokyo, Japan

[21] Appl. No.: 608,692

[22] Filed: Feb. 29, 1996

[30] Foreign Application Priority Data

Mar. 2, 1995 [JP] Japan ..................... 7-068757

[51] Int. Cl.$^6$ ..................... F16H 59/78
[52] U.S. Cl. ..................... 477/98; 477/97
[58] Field of Search ..................... 477/97, 98

[56] References Cited

U.S. PATENT DOCUMENTS

| | | | |
|---|---|---|---|
| 5,023,789 | 6/1991 | Lampe et al. | 477/97 X |
| 5,115,694 | 5/1992 | Sasaki et al. | 477/98 |
| 5,216,606 | 6/1993 | Lentz et al. | 477/98 X |
| 5,261,295 | 11/1993 | Iwanaga et al. | 477/98 |
| 5,315,897 | 5/1994 | Abe et al. | 477/98 |
| 5,319,555 | 6/1994 | Iwaki et al. | 477/98 X |
| 5,345,843 | 9/1994 | Fujita et al. | 477/98 |
| 5,469,754 | 11/1995 | Sakai et al. | 74/336 R |
| 5,484,350 | 1/1996 | Ishikawa et al. | 477/97 |

FOREIGN PATENT DOCUMENTS

| | | |
|---|---|---|
| 63-63248 | 3/1987 | Japan. |
| 7-68756 | 3/1987 | Japan. |

*Primary Examiner*—Charles A. Marmor
*Assistant Examiner*—Peter T. Kwon
*Attorney, Agent, or Firm*—Armstrong, Westerman, Hattori, McLeland & Naughton

[57] ABSTRACT

A vehicle automatic transmission control system which makes it possible to estimate an ATF temperature without using an expensive ATF temperature sensor. The estimation of the ATF temperature is configured such that based on the coolant temperature at engine starting, the temperature increase owing to heat inflow to the ATF per unit time and the temperature decrease owing to heat outflow from the ATF per unit time are calculated quantitatively and the sum of the calculated values is used to determine the estimated ATF temperature TATF. More specifically, when it is found that only a short time has passed between engine turnoff and restarting, the ATF temperature is estimated at engine restarting from the coolant temperature at engine turnoff, the estimated ATF temperature at engine turnoff and the coolant temperature at engine restarting. On the other hand, when the time between engine turnoff and restarting is found to be long, both the coolant and the ATF are assumed to be completely cooled and the ATF temperature is in principle defined as the coolant temperature at restarting.

9 Claims, 5 Drawing Sheets

CONTROL SYSTEM FOR HYDRAULICALLY OPERATED VEHICLE TRANSMISSION

BACKGROUND OF THE INVENTION

1. Field of the Invention

This invention relates to a control system for a hydraulically operated vehicle transmission, more particularly to such a control system wherein the temperature of the transmission oil (ATF) at engine restarting is accurately estimated from the engine coolant temperature to be used for gear shift control.

2. Description of the Prior Art

Generally speaking, vehicle automatic transmissions, particularly hydraulically operated transmissions, are operated by (operating) oil (automatic transmission fluid or ATF). The ATF pressure is regulated in line with various objectives so as to control gearshift shock, a control lockup clutch in a slip engagement state and the like. Since the viscosity of the ATF varies with temperature (high viscosity at low temperature and low viscosity at high temperature), the pressure rise and fall characteristics of the ATF also vary with temperature, rendering the control unstable.

Japanese Laid-Open Patent Application No. Sho 62(1987) -63248 teaches a technology for coping with this problem by providing a solenoid valve in the hydraulic control circuit, conducting control with pulse-width modulation to drive the solenoid valve so as to precisely regulate the oil pressure, providing an oil temperature sensor in the hydraulic control circuit, and correcting the duty ratio in the PWM control as a function of the detected ATF temperature, thereby preventing problems caused by variation in the ATF temperature.

Since oil temperature sensors are expensive, however, the general practice is to control the oil pressure of the automatic transmission using the engine coolant temperature, which is a required parameter for engine control anyway. Although the variation in the engine coolant temperature is ordinarily close to that of the ATF temperature, it may at times deviate greatly therefrom depending on the vehicle operating condition, most notably when the engine is restarted some time after being turned off. Because of this, the prior art systems conduct the control using broadly defined temperature zones which cannot be used for fine control.

SUMMARY OF THE INVENTION

An object of this invention is therefore to overcome the aforesaid problems of the prior art by providing a control system for a hydraulically operated vehicle transmission which enables accurate estimation of the ATF temperature even at engine restarting from the engine coolant temperature, without use of an expensive oil temperature sensor, thereby enabling fine oil pressure control based on the estimated ATF temperature.

Another object of the invention is to provide a control system for a hydraulically operated vehicle transmission which enables accurate estimation of the ATF temperature from the engine coolant temperature, without use of an expensive oil temperature sensor, and accurate estimation of the ATF temperature at engine restarting from the estimated ATF temperature, thereby enabling fine oil pressure control based on the estimated ATF temperature at engine restarting.

This invention achieves this object by providing a system for controlling a vehicle transmission operated by hydraulic fluid having an input connected to an internal combustion engine mounted on the vehicle which is cooled by a cooling medium, and an output connected to vehicle wheels, comprising first temperature detecting means for detecting a first temperature of the cooling medium at a turnoff of the engine, second temperature detecting means for detecting a second temperature of the cooling medium at a restarting of the engine after the engine turnoff, comparing means for comparing the first temperature and the second temperature, and fluid temperature estimating means for estimating a temperature of the fluid of the transmission at the engine restarting based on a result of the comparison.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
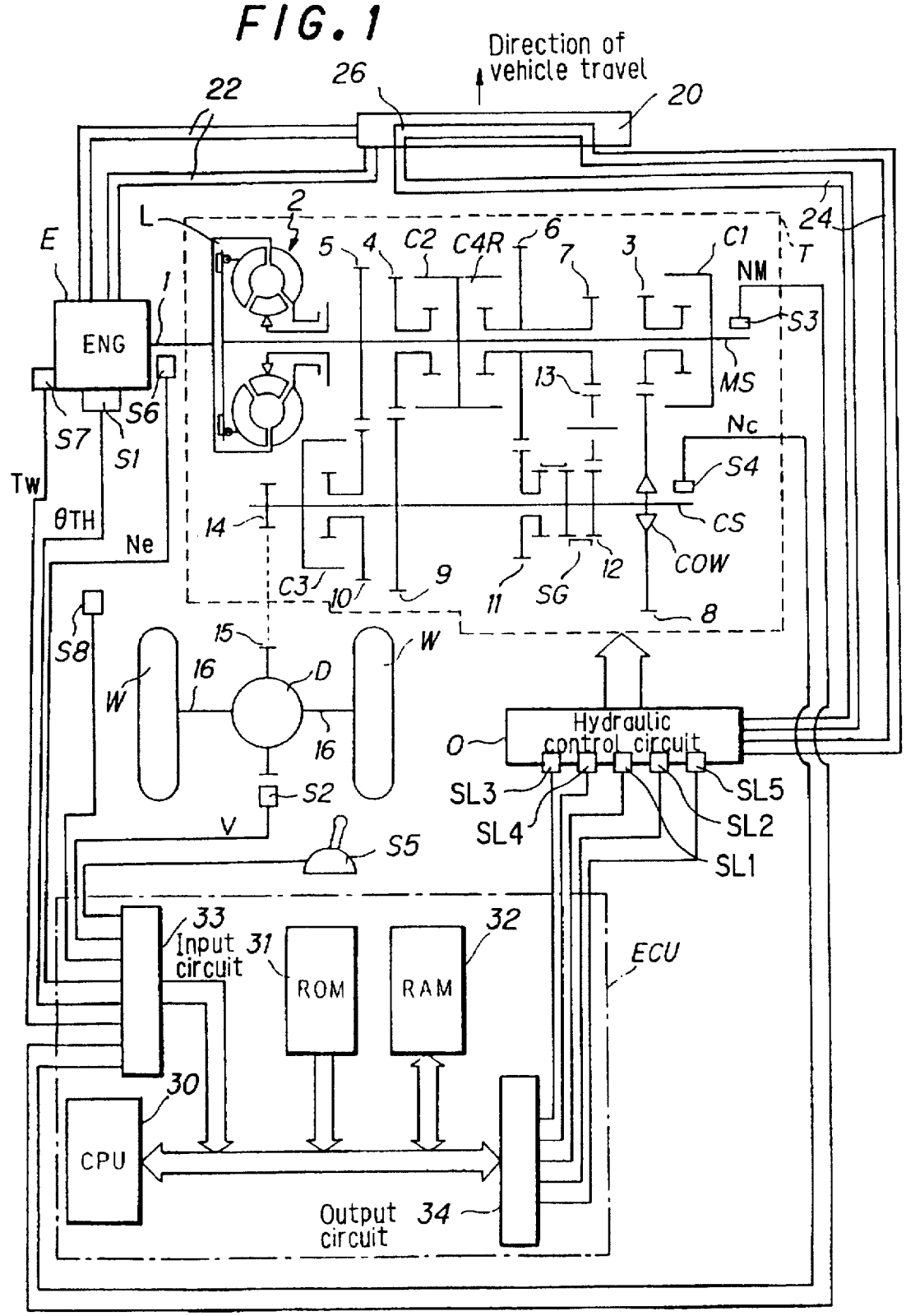
FIG. 1 is an overall view of a control system for a hydraulically operated vehicle transmission according to the invention.

FIG. 1 is an overall view of the control system for a hydraulically operated vehicle transmission according to the invention.

As shown in FIG. 1, a vehicle automatic transmission T is equipped with a main shaft MS connected with a crankshaft 1 of an internal combustion engine E through a torque converter 2 having a lockup clutch L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear (gear ratio or gear stage) is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second-fourth gears, the counter first-speed gear 8 is supported by a one-way clutch COW. The second gear is established when the main second-speed gear 4 rotatably supported on the main shaft MS is connected with the main shaft MS by a second-speed hydraulic clutch C2. The third gear is established when the counter third-speed gear 10 rotatably supported on the countershaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R. The reverse gear is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed reverse hydraulic clutch C4R.

The rotation of the countershaft CS is transmitted through a final drive gear 14 and a final driven gear 15 to a differential D, from where it is transmitted to driven wheels W, W through left and right drive shafts 16, 16.

As illustrated in the figure, the vehicle (not shown) on which the engine E is mounted, is provided with a radiator (cooling medium) 20 at its front end for removing heat from the engine coolant (water) passing through it via pipe 22 that connects the radiator to a water jacket (not shown) provided around the engine cylinders. Similarly, the radiator 20 is connected with oil circuits including hydraulic control circuit O via an ATF passage 24 for removing heat from the AFT. Specifically, the ATF passage 24 is constituted as an oil (ATF) cooler 26 for heat exchange with the engine coolant (water).

A throttle position sensor S1 is provided in an air intake pipe (not shown) of the engine E at a point in the vicinity of a throttle valve (not shown) for detecting the degree of opening or position θTH of the throttle valve. A vehicle speed sensor S2 for detecting the vehicle traveling speed V from the rotational speed of the final driven gear 15 is provided in the vicinity of the final driven gear 15. A transmission input shaft speed sensor S3 is provided in the vicinity of the main shaft MS for detecting the rotational speed NM of the transmission input shaft from the rotation of the main shaft MS, and a transmission output shaft speed sensor S4 is provided in the vicinity of the countershaft CS for detecting the rotational speed Nc of the transmission output shaft from the rotation of the countershaft CS.

A shift lever position sensor S5 is provided in the vicinity of a shift lever (not shown) installed on the vehicle floor near the driver's seat that allows the driver to select one of seven positions P, R, N, D4, D3, 2 and 1 each corresponding to the gear ranges mentioned above in the well-known manner. Moreover, a crank angle sensor S6 is provided in the vicinity of the crankshaft 1 of the engine E for detecting the engine speed Ne from the rotation of the crankshaft 1, and a coolant temperature sensor S7 for detecting the engine coolant (water) temperature Tw is provided at an appropriate location on the passage 22 of the engine E. Outputs of the sensors S1, etc., are sent to an ECU (electronic control unit).

The ECU is constituted as a microcomputer comprising a CPU (central processing unit) 30, a ROM (read-only memory) 31, a RAM (random access memory) 32, an input circuit 33 and an output circuit 34. The outputs of the sensors S1, etc., are input to the microcomputer through the input circuit 33. The CPU 30 of the microcomputer determines the gear (gear ratio) and energizes/deenergizes shift solenoids SL1, SL2 of a hydraulic control circuit O via the output circuit 34 so as to switch shift valves (not shown) and thereby engage/disengage the hydraulic clutches of prescribed gears, and controls the operation of the lockup clutch L of the torque converter 2 via control solenoids SL3 and SL4. The CPU 30 also controls the clutch hydraulic pressure by controlling a linear solenoid SL5. The CPU 30 further detects the ATF temperature TATF as explained later.

Figure 2:
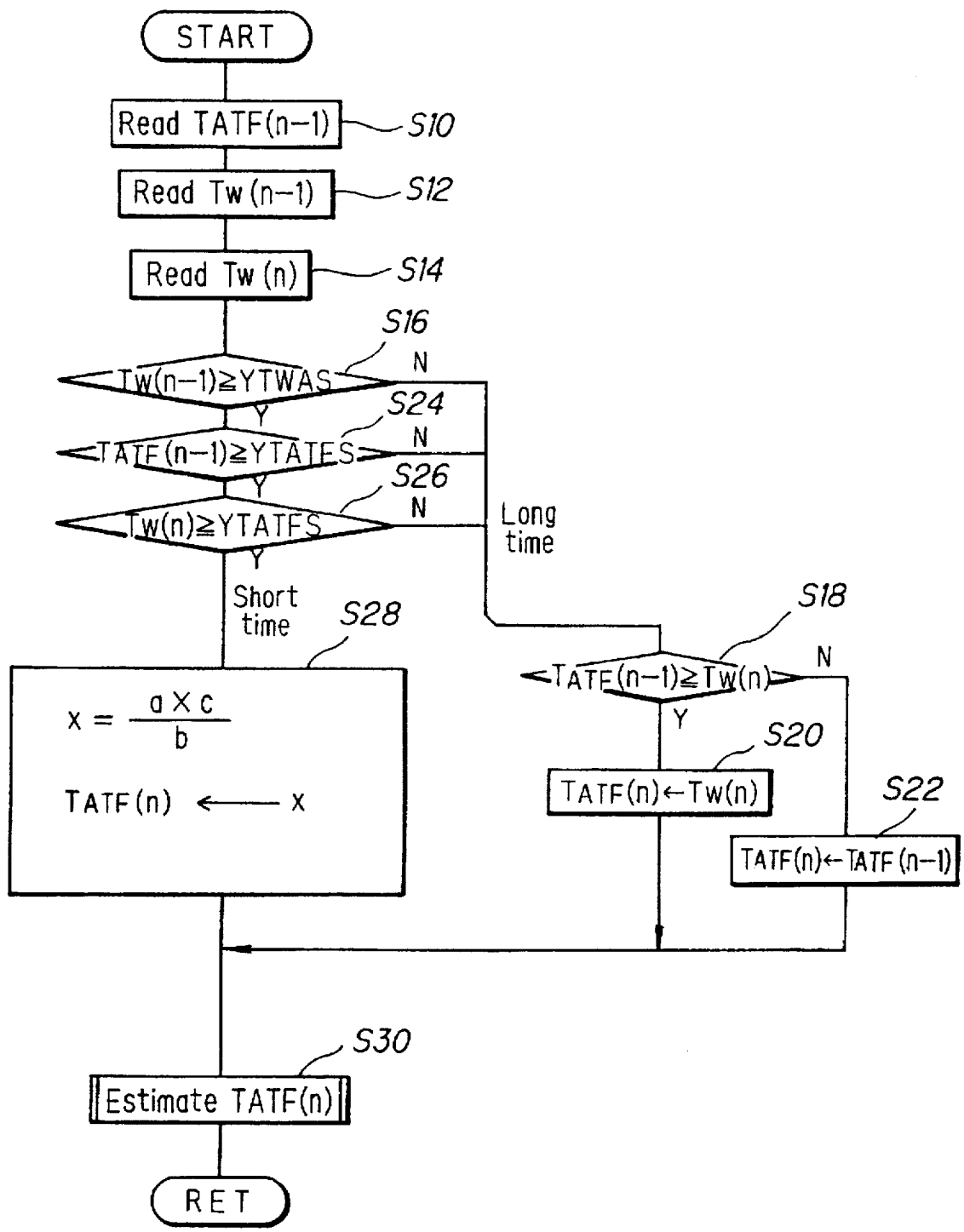
FIG. 2 is a flowchart showing the operation of the system illustrated in FIG. 1 according to the invention.

FIG. 2 is a flowchart of the main routine for estimating the ATF temperature. The explanation of this figure will, however, be preceded by a brief explanation of the estimation according the invention.

While the ATF temperature and the engine coolant temperature ordinarily follow the same variation pattern, they may nevertheless deviate greatly depending on the vehicle operating condition. This is particularly true when the engine is operated, turned off and then restarted some time later. Simply stated, the variation patterns of the ATF temperature and the engine coolant temperature do not necessarily coincide between the time the ignition is turned off and the time it is turned back on.

It is known from experience, however, that the temperature fall curves of the ATF temperature and the engine coolant temperature following engine turnoff resemble linear functions and that their time constants are nearly identical.

Figure 3:
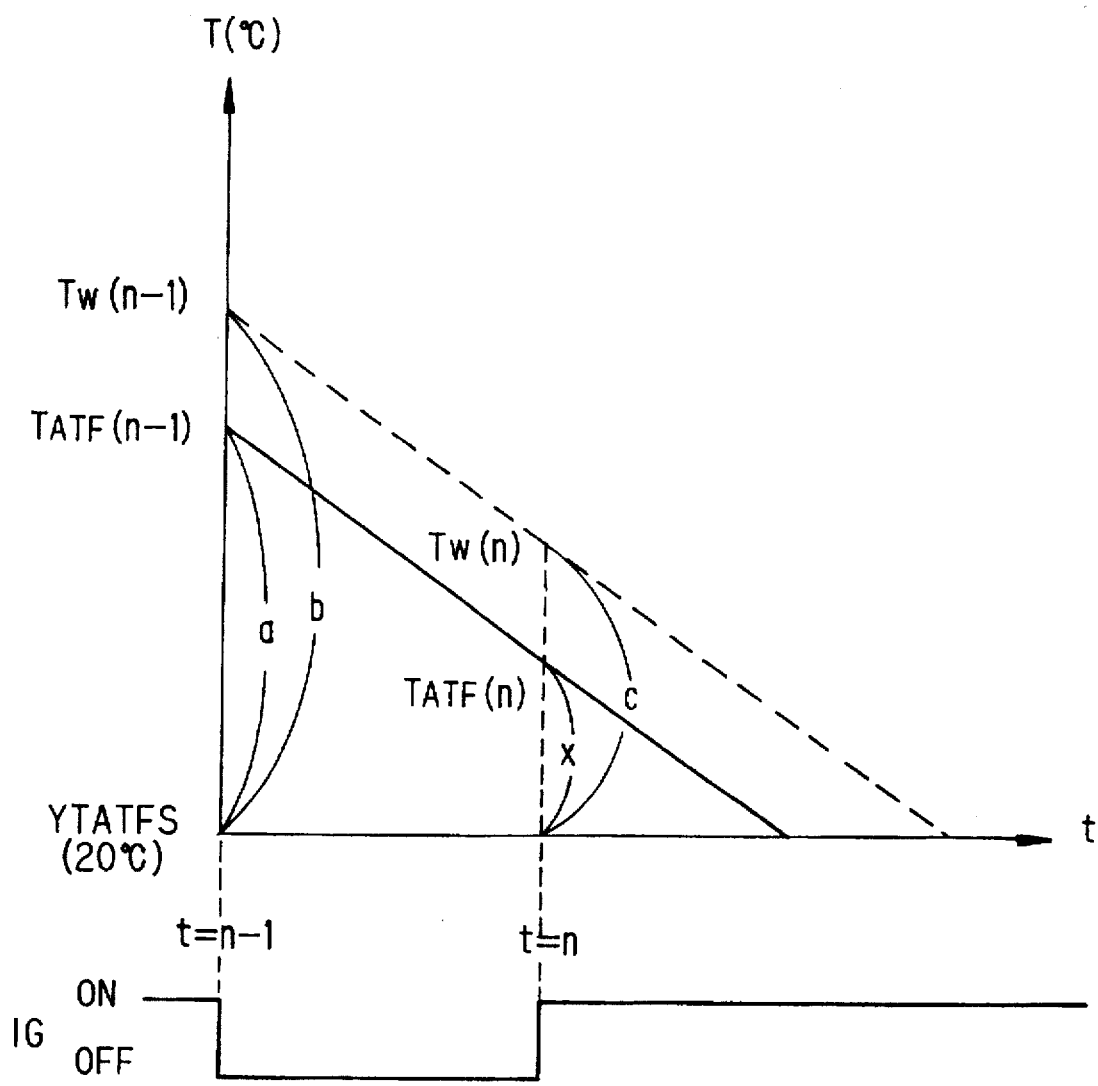
FIG. 3 is a graph showing the temperature fall curves of the engine coolant temperature and the ATF temperature defined by the inventors.

As shown in FIG. 3, the inventors therefore define the temperature fall curves of the engine coolant temperature Tw (detected value) and the ATF temperature TATF (estimated value) as linear functions having a proportional relationship and, when it is found that only a short time has passed between engine turnoff and restarting, the ATF temperature at engine restarting may be estimated from the coolant temperature at engine turnoff, the estimated ATF temperature at engine turnoff and the coolant temperature at engine restarting.

On the other hand, when the time between engine turnoff and restarting is found to be long, both the coolant and the ATF are assumed to be completely cooled and the ATF temperature is in principle defined as the coolant temperature at restarting.

Based on the foregoing background explanation, the operation of the system will now be explained with reference to the flowchart of FIG. 2. The routine of this flowchart is activated only once at engine starting.

First, in S10, the ATF temperature TATF(n−1) estimated in the preceding cycle, i.e., the final temperature estimated earlier at the time of engine turnoff, is read from the backup section of the RAM 32. This estimation will be explained later.

Next, in S12, the coolant temperature Tw(n−1), detected in the preceding cycle, i.e., the final temperature detected earlier at the time of engine turnoff, is read from the backup section of the RAM 32, whereafter the program goes to S14, in which the coolant temperature Tw(n) first detected at engine restarting is read from the RAM 32.

The program then advances to S16, in which it is checked whether the coolant temperature Tw(n−1) detected in the preceding cycle is at or above a prescribed temperature YTWAS (e.g., 45° C.). When S16 finds that the coolant temperature Tw(n−1) detected in the preceding cycle is less than the prescribed temperature YTWAS, both the coolant temperature and the ATF temperature can be assumed to be low in the current cycle irrespective of the time between engine turnoff and restarting. The program therefore goes to S18, in which it is checked whether the ATF temperature TATF(n−1) estimated in the preceding cycle is at or above the coolant temperature Tw(n) detected in the current cycle.

When S18 finds that the ATF temperature TATF(n−1) estimated in the preceding cycle is at or above the coolant temperature Tw(n) detected in the current cycle, the program goes to S20, in which the coolant temperature Tw(n) detected in the current cycle is used as the value of the estimated ATF temperature TATF(n) in the current cycle. In other words, the coolant temperature detected in the current cycle is used as the initial value of the ATF temperature.

On the other hand, when S18 finds that the ATF temperature TATF(n−1) estimated in the preceding cycle is lower than the coolant temperature Tw(n) detected in the current cycle, the program goes to S22, in which the ATF temperature TATF(n−1) estimated in the preceding cycle is used as the value of the estimated ATF temperature TATF(n) in the current cycle. In other words, the ATF temperature estimated at the time of engine turnoff is used as the initial value of the ATF temperature.

This is based on the assumption that the ATF temperature cannot be higher than the engine coolant temperature because the engine coolant is closer to the heat source (the engine) than the ATF. Therefore, when it is found that the ATF temperature TATF(n−1) estimated in the preceding cycle is lower than the coolant temperature Tw(n) detected in the current cycle, the ATF temperature TATF(n−1) estimated in the preceding cycle, not the coolant temperature Tw(n) detected in the current cycle, is used as the value of the estimated ATF temperature TATF(n) in the current cycle.

When S16 finds that the coolant temperature Tw(n−1) detected in the preceding cycle is at or above the prescribed temperature YTWAS (e.g., 45° C.), the program goes to S24, in which it is checked whether the ATF temperature TATF (n−1) estimated in the preceding cycle is at or above a prescribed temperature YTATFS (e.g., 20° C.).

When the result in S24 is YES, the program goes to S26 (explained below). When it is NO, this means that the proportional relationship explained earlier with reference to FIG. 3 does not hold and the program goes to S18 and the following steps, in which processing like that explained above is conducted.

When the result in S24 is YES, the program goes to S26, in which it is checked whether the coolant temperature Tw(n) detected in the current cycle is at or above the prescribed temperature YTATFS (e.g., 20° C.). While a similar check was made earlier in S16, the purpose here is to estimate the time between engine turnoff and restarting. When the result in S26 is NO, this means that the engine has been left inoperative for a long time and the program goes to S18 and the following steps for estimating the transmission temperature by the procedure explained earlier.

When the result in S26 is YES, the program goes to S28, in which the ATF temperature TATF(n) (estimated initial ATF temperature at engine restarting) is estimated as shown in the figure. This amounts to using the proportional relationship shown in FIG. 3 to calculate x shown in the same figure and defining the result as TATF(n).

The program then goes to S30, in which the ATF temperature after starting is successively estimated based on the ATF temperature TATF(n) at restarting calculated in the foregoing manner. When the engine is turned off, the last estimated value calculated is stored to memory for use in S10 as the ATF temperature TATF(n−1) estimated in the preceding cycle when the engine is restarted. This invention does not particularly specify the method for estimation of the ATF temperature after engine starting. Since details of the estimation for this purpose can be found in the assignee's Japanese Application No. Hei(1995)-68756, it is discussed only briefly in the following.

Figure 4:
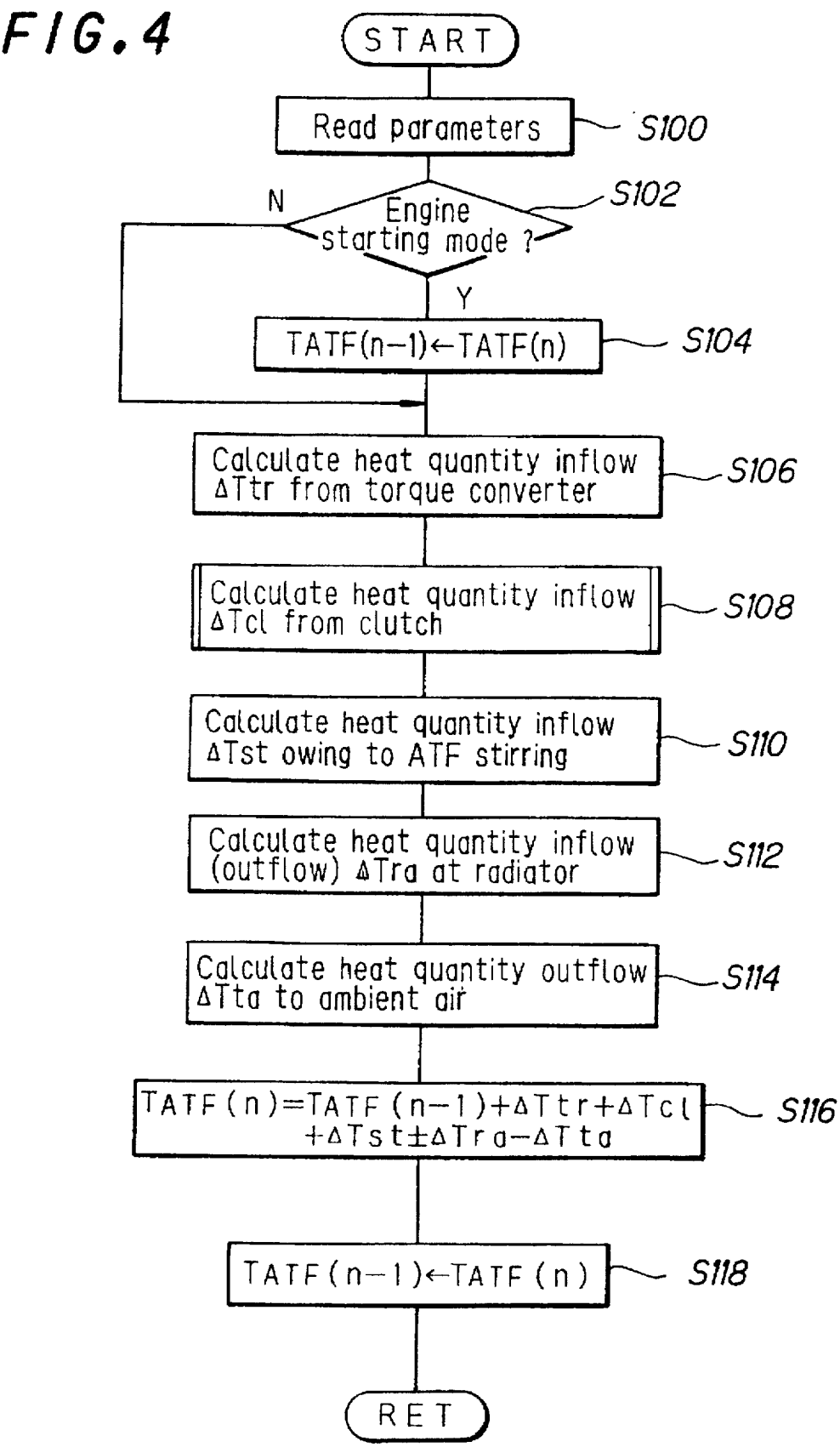
FIG. 4 is a flowchart showing a subroutine for estimating the ATF temperature referred to in the flowchart of FIG. 2.

FIG. 4 is a flowchart of a subroutine for estimating the ATF temperature after engine starting. The subroutine initially uses the coolant temperature at engine starting as the estimated ATF temperature TATF. After starting, it calculates the temperature increase owing to heat inflow to the ATF per unit time and the temperature decrease owing to heat outflow from the ATF per unit time quantitatively and uses the sum of the calculated values to determine the estimated ATF temperature TATF. The parameters used for calculating the temperature increase and decrease include the state of the torque converter, the type of gearshift (specifically, the gear ratio difference, i.e., the difference in heat quantity inflow owing to friction), the vehicle speed (temperature increase owing to stirring (agitation) of the ATF and decrease owing to air cooling), the state of the radiator (heat exchange with the engine coolant in the radiator), and the like.

More specifically, the heat quantity inflow from the torque converter, the heat quantity inflow from the clutch (frictional engagement element), the heat quantity inflow (or outflow) at the radiator and the heat quantity outflow to the ambient air, per second, are calculated, and the ATF temperature TATF is estimated based on the sum of the calculated values. In other words, the current ATF temperature TATF(n) is estimated by successively adding the aforesaid sum to the coolant temperature at engine starting once per second. Here, n inherently means a sample number in the discrete system and, more specifically, it means the time at which the FIG. 4 flowchart is activated.

The heat flow relative to the ambient air is always a value in the direction of cooling (heat outflow) and is therefore treated as a negative value. Since the heat exchange at the radiator can be in either the heating (positive) or the cooling (negative) direction, it is treated as positive or negative depending on the direction of the heat flow. The remaining factors have only heating direction values and are all treated as positive.

The subroutine of FIG. 4 will now be explained. It is activated once per second.

The engine speed Ne, the engine coolant temperature Tw and other parameters are first read in S100. The program then goes to S102, in which it is checked whether the engine is in starting mode. When the result in S102 is YES, the program goes to S104, in which the ATF temperature TATF(n) estimated in the main routine of FIG. 2 is used as the ATF temperature TATF(n−1) (the value of the ATF temperature TATF estimated in the preceding cycle (program loop)).

The program then goes to S106, in which the heat quantity inflow Delta Ttr from the torque converter is determined.

Where Delta Q(J) is the heat quantity required to raise the temperature T(K) of a material of mass m(g) by Delta T(K), the specific heat at temperature T is given by Delta Q/m Delta T when Delta T approaches 0 as a limit. When the temperature dependence of the specific heat is sufficiently gradual, the specific heat defines the quantity of heat required to raise the temperature of 1 g of the material by 1K.

The difference between the energy input to and output by the torque converter can be considered to be energy absorbed by the torque converter as heat owing to fluid friction etc., and the adsorbed heat can be assumed to produce an increase in the temperature of the ATF. The temperature increase (heat inflow) produced by the torque converter per unit time can therefore be calculated from the energy absorbed by the torque converter, the specific heat of the ATF and the specific heat of the steel, aluminum and other metals constituting the material of the torque converter.

In light of the foregoing, the heat quantity inflow Delta Ttr from the torque converter can be calculated from Eq. 1.

$$\Delta Ttr=(1-n)\times\tau(Ne/1000)^2 g\times NIN \text{ [J/sec]} \quad \text{(Eq. 1)}$$

where n: torque converter efficiency, $\tau(Ne/1000)^2$ g: input torque,

NIN: torque converter input speed [rad/sec].

In Eq. 1, NIN (input speed) is calculated from the engine speed Ne. $\tau$ is the pump absorption torque. Its value is a function of the input-output rotational speed ratio $e$ and is independent of the input speed. Since the torque converter efficiency n is obtained as $\tau\times$ input-output torque ratio $k$, moreover, $\tau$, n and the like can be prepared as mapped data beforehand for retrieval using $e$ and $k$ as address data.

The program then advances to S108 in the flowchart of FIG. 4 for calculation of the heat quantity inflow Delta Tcl from the clutch.

Since the heat quantity inflow Delta Tcl from the clutch can be assumed to be proportional to the product of the difference between the clutch input and output rotational speeds (relative rotation) and the torque capacity of the clutch, it can be calculated according to Eq. 2.

$$\Delta Tcl=(\tfrac{1}{2})\times(NIN-NOUT)\times A\times\tau(Ne/1000)^2 g \text{ [J/sec]} \quad \text{(Eq. 2)}$$

where (NIN−NOUT): relative rotation [rad/sec].

The multiplication of the calculated value of (relative rotation×torque capacity of clutch) by ½ in Eq. 2 is to enable an approximate calculation of the heat inflow per unit time by use of a constant speed change rate notwithstanding that the relative rotation approaches zero as the speed change proceeds. NIN is again calculated from the engine speed Ne, and NOUT is calculated from the main shaft rotational speed NM. A is a coefficient invented by the inventors for indicating robustness against engine revving and is indicative of the clutch engaging force.

Since (NIN−NOUT) and A are determined by the type of gearshift and the engine speed, in this embodiment the other coefficients are grouped and the calculation is simplified as shown by Eq. 3.

$$\Delta Tcl=A\times(Ne/1000) \text{ [J/sec]} \quad \text{(Eq. 3)}$$

Figure 5:
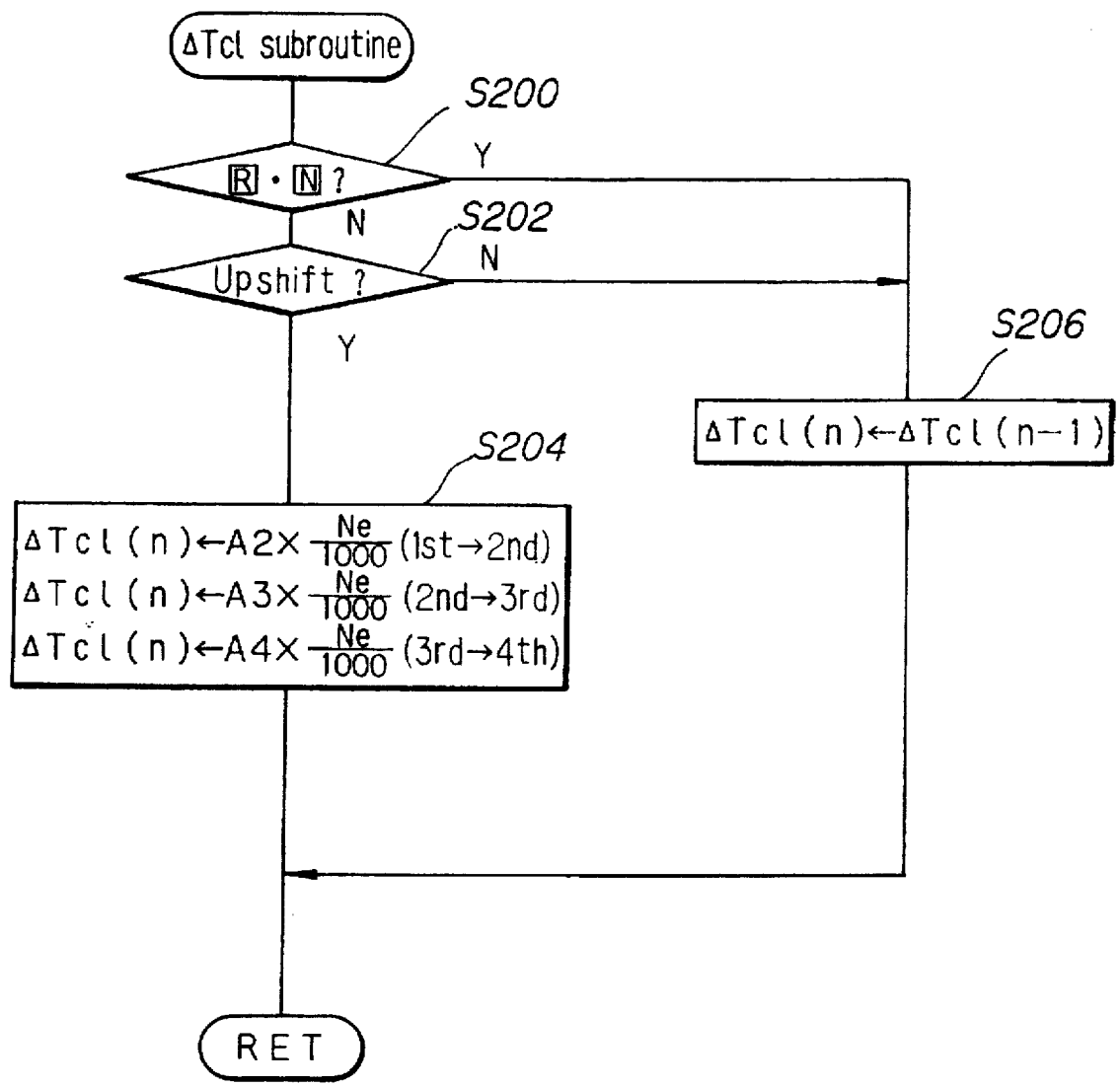
FIG. 5 is a flowchart showing a subroutine for calculating the heat quality inflow from the clutch referred to in the flowchart of FIG. 4.

FIG. 5 is the flowchart of a subroutine for calculating the heat quantity inflow Delta Tcl from the clutch.

First, in S200, it is checked whether the selected position is R (reverse driving) or N (neutral). When the result is NO, the program goes to S202, in which it is checked whether an upshift has occurred. When the result is YES, the program goes to S204, in which the heat quantity inflow Delta Tcl from the clutch is calculated as shown in the figure. It will be noted that the coefficient A is specified separately as A2, A3 and A4 for different gear ratios. This is because the amount of friction and, accordingly, the heat quantity inflow, differ depending on the gear.

On the other hand, when S202 in FIG. 5 finds that upshift has not occurred, the program goes to S206, in which Delta Tcl(n−1) calculated in the preceding cycle (or, if not available, an appropriately set initial value) is used as Delta Tcl(n) in the current cycle. The heat quantity inflow is thus calculated (updated) only when an upshift occurs. This because the heat quantity produced by friction during a downshift is small owing to the fact that the shift is ordinarily conducted after using co-engagement control to increase the engine speed and reduce the relative rotation difference, while the heat quantity generated during an upshift is ordinarily large because the difficulty of implementing the same technique makes it necessary to absorb most of the relative rotation difference by friction.

When the result in S200 is YES, the heat quantity inflow is not calculated (updated) because the clutch does not operate in the N position and gearshift is impossible in the R position.

The program then goes to S110 in the flowchart of FIG. 4 for calculation of the heat quantity inflow Delta Tst owing to ATF stirring.

The heat quantity inflow Delta Tst owing to stirring of the ATF by the gears, i.e., from the friction of stirring, is calculated according to Eq. 4.

$$\Delta Tst=B\times V^2 \text{ [J/sec]} \quad \text{(Eq. 4)}$$

where

B: coefficient [N],

V: vehicle speed [m/sec].

This approximation of Delta Tst as the product of the square of the vehicle speed V and a coefficient B is reasonable since during vehicle driving the AFT contained in the transmission case is stirred by various gears, including the final drive gear 14, the final driven gear 15 and the gears on the countershaft CS, and the rotational speed NC of the countershaft CS is approximately proportional to the vehicle speed V. The coefficient B is an appropriate value determined experimentally. The rotational speed NC can of course be used in place of the vehicle speed V.

The program then advances to S112, in which the heat quantity inflow (outflow) Delta Tra at the radiator is calculated.

As was explained earlier with reference to FIG. 1, heat is exchanged between the ATF and the engine coolant in the radiator 20. The heat quantity inflow (outflow) Delta Tra at the radiator is therefore calculated according to Eq. 5.

$$\Delta Tra=C\times(Tw-TATF(n-1)) \text{ [J/sec]} \quad \text{(Eq. 5)}$$

where

C: coefficient [N·m/°C.sec],

Tw: Coolant temperature [°C.].

In other words, the calculation is made by subtracting the ATF temperature TATF(n−1) estimated in the preceding cycle from the coolant temperature Tw and multiplying the difference by the coefficient C. As a result, the calculated value is positive (heat inflow) when the coolant temperature Tw is high and is negative (heat out-flow) when the coolant temperature Tw is low. The coefficient C in Eq. 5 is determined experimentally.

The program then goes to S114, in which the heat quantity outflow Delta Tta to the ambient air is calculated.

The ambient air cools the ATF. As explained earlier, therefore, the heat flow relative to the ambient air is treated as heat outflow, not heat inflow. The cooling by (heat outflow to) the ambient air is proportional to wind velocity (i.e., the vehicle speed V) and is dependent on the difference between the transmission temperature (substantially equivalent to the ATF temperature) and the temperature of the ambient air. It is therefore calculated according to Eq. 6.

$$\Delta Tta=D\times(Tair-TATF(n-1))\times V \text{ [J/sec]} \quad \text{(Eq. 6)}$$

where

D: coefficient [N/°C. ]

Tair: Ambient air temp. [°C.].

The calculation according to Eq. 6 is reasonable because the amount of change in the ATF temperature TATF per unit time can be considered to be proportional to the difference between the ambient air temperature Tair and the ATF temperature TATF. D is an appropriately defined coefficient.

The program then advances to S116 in the flowchart of FIG. 4 for summing the values calculated in the foregoing manner and adding the result to the ATF temperature TATF (n−1) estimated in the preceding cycle to obtain the ATF temperature TATF(n) estimated in the current cycle. As mentioned earlier, the calculated heat flow Delta Tra relative to the radiator can be either positive or negative and the calculated heat flow Delta Tta relative to the ambient air is always negative.

The program then goes to S118, in which the ATF temperature TATF(n−1) estimated in the preceding cycle is replaced by the ATF temperature TATF(n) estimated in the current cycle for use in the calculation in the next cycle, whereafter the subroutine is terminated. Therefore, at each following activation of the subroutine, when S102 finds that engine is not in starting mode, the program skips S104 and the value rewritten in S118 is used as the value in the preceding cycle. The updated value in S118 is stored to the backup section when the engine is stopped.

Based on the above, the control using the estimated value will be carried out in a similar manner as is taught by the aforesaid prior art in which the solenoid valve is pulse-width modulation controlled to drive the solenoid valve so as to precisely regulate the oil pressure, while correcting the duty ratio in the PWM control as a function of the estimated ATF temperature, thereby preventing problems caused by variation in the ATF temperature.

Owing to the configuration described in the foregoing, this embodiment is able to estimate the ATF temperature at engine starting with high accuracy, without use of an expensive oil pressure sensor. In addition, since the estimated starting temperature can be used for accurately estimating the ATF temperature thereafter, estimated values can also be used at the time of controlling the oil pressure and the like, thereby enabling fine control.

While the foregoing example refers to only a clutch as an example of a frictional engagement element, the invention also encompasses the case where the frictional engagement element further includes a brake.

Although the invention has thus been shown and described with reference to specific embodiments, it should be noted that the invention is in no way limited to the details of the described arrangements, changes and modifications may be made without departing from the scope of the invention, which is defined by the appended claims.

What is claimed is:

1. A system for controlling a vehicle transmission operated by pressurized hydraulic fluid having an input connected to an internal combustion engine mounted on the vehicle which is cooled by a cooling medium, and an output connected to vehicle wheels, comprising:

first temperature detecting means for detecting a first temperature of the cooling medium at a turnoff of the engine;

second temperature detecting means for detecting a second temperature of the cooling medium at a restarting of the engine after the engine turnoff;

comparing means for comparing the first temperature and the second temperature;

fluid temperature estimating means for estimating a temperature of the fluid of the transmission at the engine restarting based on a result of the comparison; and transmission fluid pressure control means for controlling pressure of the fluid of the transmission as a function of the estimated temperature of the fluid of the transmission.

2. A system according to claim 1, wherein said fluid temperature estimating means estimates the second temperature of the cooling medium as the temperature of the fluid, when a difference between the first temperature of the cooling medium and the second temperature of the cooling medium is found to be greater than a predetermined value.

3. A system according to claim 1, wherein said fluid temperature estimating means estimates the second temperature of the cooling medium as the temperature of the fluid, when a time between the engine turnoff and the engine restarting is long.

4. A system according to claim 1, wherein said fluid temperature estimating means estimates the second temperature of the cooling medium as the temperature of the fluid, when the second temperature of the cooling medium is not less than a predetermined temperature.

5. A system for controlling a vehicle transmission operated by pressurized hydraulic fluid having an input connected to an internal combustion engine mounted on the vehicle which is cooled by a cooling medium, and an output connected to a vehicle wheel, comprising:

vehicle operating condition detecting means for detecting operating conditions;

first temperature detecting means for detecting a first temperature of the cooling medium at a turnoff of the engine;

second temperature detecting means for detecting a second temperature of the cooling medium at a restarting of the engine after the engine turnoff;

comparing means for comparing the first temperature and the second temperature;

first fluid temperature estimating means for estimating a fluid temperature based on the operating condition of the vehicle up to the turnoff of the engine;

second fluid temperature estimating means for estimating a fluid temperature at the engine restarting based on a result of the comparison and the temperature estimated by the first estimating means; and transmission fluid pressure control means for controlling the pressure of the fluid of the transmission as a function of the estimated fluid temperature estimated by said second fluid temperature estimating means.

6. A system according to claim 5, wherein said second fluid temperature estimating means estimates the second temperature of the cooling medium as the fluid temperature at the engine restarting, when a difference between the first temperature of the cooling medium and the second temperature of the cooling medium is found to be greater than a predetermined value.

7. A system according to claim 5, wherein said second fluid temperature estimating means estimates the second temperature of the cooling medium as the fluid temperature at the engine restarting, when a time between the engine turnoff and the engine restarting is long.

8. A system according to claim 1, wherein said fluid temperature estimating means estimates the second temperature of the cooling medium as the fluid temperature at the engine restarting, when the second temperature of the cooling medium is not less than a predetermined temperature.

9. A system according to claim 5, wherein the operating conditions of the vehicle include at least a heat quantity generated by stirring of the fluid and a heat quantity radiated from the transmission.

* * * * *